United States Patent [19]

Rach et al.

[11] 4,337,813
[45] Jul. 6, 1982

[54] TREAD CONFIGURATION OF PNEUMATIC TIRES FOR MOTOR VEHICLES

[75] Inventors: Heinz-Dieter Rach, Garbsen; Henner Pieper, Langenhagen, both of Fed. Rep. of Germany

[73] Assignee: Continental Gummi-Werke Aktiengesellschaft, Hanover, Fed. Rep. of Germany

[21] Appl. No.: 177,857

[22] Filed: Aug. 14, 1980

[30] Foreign Application Priority Data

Aug. 18, 1979 [DE] Fed. Rep. of Germany ....... 2933485

[51] Int. Cl.$^3$ .............................................. B60C 11/10
[52] U.S. Cl. ............................. 152/209 R; D12/140
[58] Field of Search ........... 152/209 R, 209 B, 209 D; D12/136, 140, 150

[56] References Cited

U.S. PATENT DOCUMENTS

| D. 57,835 | 5/1921 | Greene | D12/140 |
| D. 58,547 | 8/1921 | Clough | D12/140 |
| D. 59,794 | 11/1921 | Troast | D12/140 |
| 933,110 | 9/1909 | Kempes | 152/209 |

*Primary Examiner*—Michael W. Ball
*Attorney, Agent, or Firm*—Becker & Becker, Inc.

[57] ABSTRACT

A tread configuration for pneumatic vehicle tires, particularly for spare tires, having a large number of depressions which are separated from each other by transverse webs and peripheral webs, and are successively arranged in the transverse and the peripheral directions of the tire. The depressions have an approximately rectangular cross section, and extend transverse to the peripheral direction of the tire. The webs which limit or define the depressions have a width corresponding to approximately $\frac{1}{4}$ to $\frac{3}{4}$ of the peripheral dimension of the depressions.

5 Claims, 1 Drawing Figure

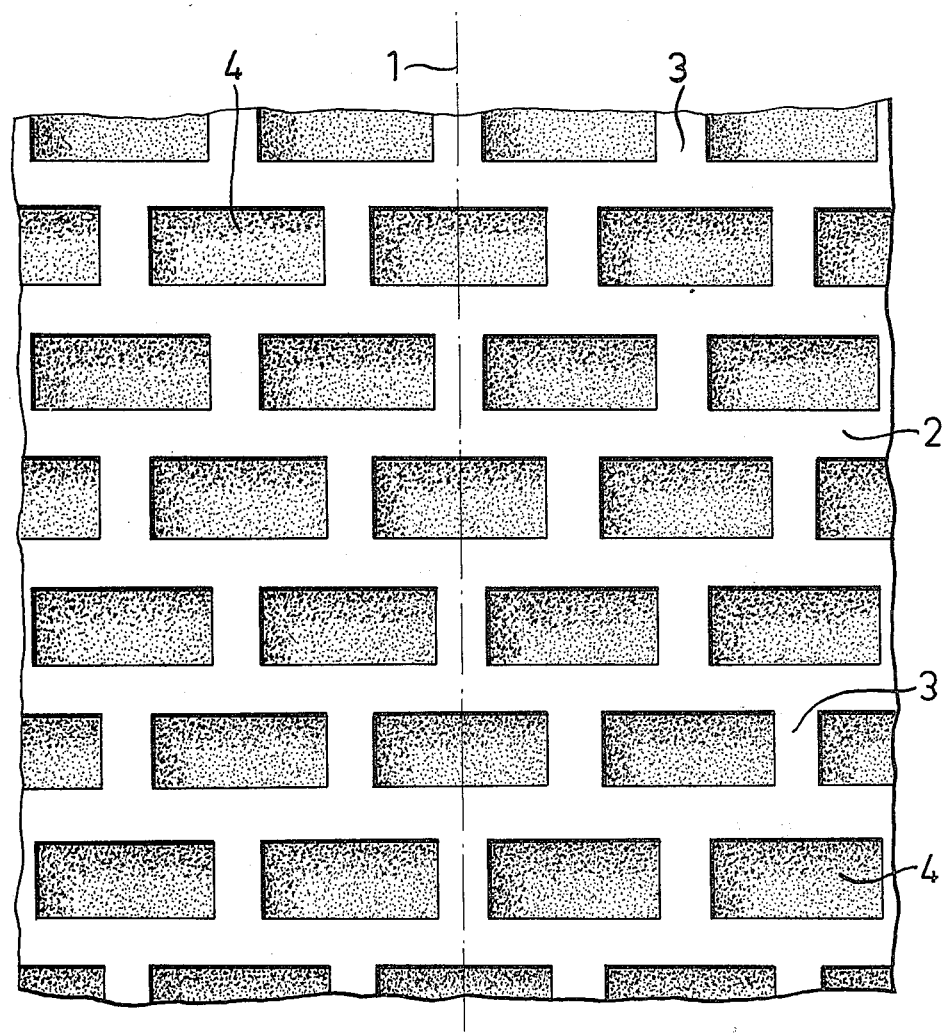

TREAD CONFIGURATION OF PNEUMATIC TIRES FOR MOTOR VEHICLES

The present invention relates to a tread configuration for pneumatic vehicle tires, especially spare tires, having a large number of depressions or recesses which are successively arranged in the peripheral direction of the tire and in the transverse direction of the tire, and are separated from each other by transverse webs and peripheral webs.

The depressions serve as suction cups with thus embodied pneumatic vehicle tires in order thereby to achieve an anti-skid property.

The innovation of the present invention proceeds upon the basis of the recognition that the effect of suction cups is insufficient, and the wheel forces can be transferred only by comparatively compact ribs, blocks, and the like.

In pursuing this concept, it is an object of the present invention to provide a tire which is especially suitable for spare tires or reserve wheels of motor vehicles, and in particular has a special characteristic. What is required is a pneumatic tire of this type which is distinguished by a comparatively great noise formation in such a manner that the user of this tire is constantly acoustically reminded that a spare tire is being used, which tire serves only for this purpose and must already after a short operating time be exchanged, i.e., is not intended for continuous operation, especially not for high speeds.

This object, and other objects and advantages of the present invention, will appear more clearly from the following specification in connection with the accompanying FIGURE, which shows a partial plan view of an inventive tread of a pneumatic tire for a spare tire for road vehicles.

The tread configuration of the present invention is characterized primarily by essentially rectangular depressions which extend transverse to the circumferential or peripheral direction of the tire and are separated from each other by webs, the width of which corresponds to approximately ¼ to ¾ of the width of the depressions (measured in the peripheral direction).

Preferably, however, the web width is approximately half as large as the peripheral dimension of the depressions. These web widths apply not only to the webs which extend in the transverse direction of the tire, but also to the webs which extend in the peripheral direction of the tire.

The spacing between webs extending in the peripheral direction of the tire (spacing between two successive webs as viewed in the transverse direction of the tire), in other words, the transverse or axial dimension of the depressions, is preferably three to four times a web width.

Referring now to the drawing in detail, line 1 represents the middle of the tread as well as the circumferential or peripheral direction of the tire. The tread profile essentially comprises transverse webs 2 which extend continuously and uninterrupted from one tread edge to the other tread edge, with the webs 2 being connected by web 3 which extend in the peripheral direction, the webs 3 of successive transverse web pairs being displaced or offset relative to each other.

The webs 2, 3 limit or define rectangular recesses or depressions 4 which, because of the webs 2, 3, form cell-like enclosures during full engagement upon the roadway. The width of the webs 2 and 3 corresponds to approximately half the peripheral dimension of the depressions 4, or half the distance between successive transverse webs 2. This measurement is also true for the peripheral webs 3 which, however, are spaced from one another by four times the web width.

The depth of the rectangular depressions 4 likewise corresponds to approximately half the width of the webs 2, 3, with the web width being about 6 to 14 mm.

The thus embodied tire profile or configuration causes a loud noise to be generated, which reminds the user of the tire of the necessity of changing the tire.

As recognizable from the FIGURE, as seen in the transverse direction of the tire, three or four webs 3 are respectively successively arranged; correspondingly, four depressions 4 are also respectively successively arranged.

The present invention is, of course, in no way restricted to the specific disclosure of the specification and drawing, but also encompasses any modifications within the scope of the appended claims.

What we claim is:

1. A tread configuration with an axial direction and a circumferential direction for pneumatic vehicle tires especially spare tires to be used temporarily, consisting of in combination: transverse webs having a width, circumferential webs with a circumferential dimension, and a large number of substantially rectangular depressions having a long side located along the axial direction of the tire, said depressions being successively arranged in both the axial and circumferential directions of the tire, said depressions being respectively separated from one another by successive transverse webs and circumferential webs, the width of said webs corresponding to approximately ¼ to ¾ of the circumferential dimension of said depressions, said circumferential webs in pairs being offset relative to each other without any circumferential rows thereof being provided though sequentially following each other in offset relationship so that the tread configuration causes a loud noise to be generated as a constant reminder for necessity of changing the tire which is not intended for continuous operation, especially not for high speeds.

2. A tread configuration in combination according to claim 1, in which the width of said webs is approximately ½ of the circumferential dimension of said depressions.

3. A tread configuration in combination to claim 1, in which the distance between two successive circumferential webs is approximately three to four times the width of said webs.

4. A tread configuration in combination according to claim 1, in which the depth of said depressions equals approximately ½ of the width of said webs.

5. A tread configuration in combination according to claim 4, in which the width of said webs is approximately 6 to 14 mm.

* * * * *